United States Patent
Park et al.

(10) Patent No.: US 9,948,979 B2
(45) Date of Patent: Apr. 17, 2018

(54) USER TERMINAL AND CONTROL METHOD THEREOF

(71) Applicant: Samsung Electronics Co., Ltd., Suwon-si, Gyeonggi-do (KR)

(72) Inventors: Jong-chan Park, Uiwang-si (KR); Kang-min Lee, Hwaseong-si (KR); Seok-min Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/597,467

(22) Filed: Jan. 15, 2015

(65) Prior Publication Data

US 2015/0229997 A1 Aug. 13, 2015

(30) Foreign Application Priority Data

Feb. 7, 2014 (KR) ........................ 10-2014-0014222

(51) Int. Cl.

| | |
|---|---|
| *H04N 21/436* | (2011.01) |
| *H04N 21/4363* | (2011.01) |
| *H04N 21/482* | (2011.01) |
| *H04N 21/637* | (2011.01) |
| *H04L 29/08* | (2006.01) |
| *H04N 21/41* | (2011.01) |
| *H04N 21/422* | (2011.01) |

(52) U.S. Cl.
CPC ... *H04N 21/43615* (2013.01); *H04L 67/1095* (2013.01); *H04N 21/4122* (2013.01); *H04N 21/4126* (2013.01); *H04N 21/42224* (2013.01); *H04N 21/482* (2013.01); *H04N 21/637* (2013.01)

(58) Field of Classification Search
CPC ....... H04N 21/43615; H04N 21/43637; H04N 21/4122; H04L 67/1095
See application file for complete search history.

(56) References Cited

U.S. PATENT DOCUMENTS

| | | |
|---|---|---|
| 7,676,690 B2 | 3/2010 | Bucher et al. |
| 8,255,825 B2 | 8/2012 | Morris |
| 2010/0185764 A1* | 7/2010 | Kondo ................ H04L 12/2807 709/225 |

(Continued)

FOREIGN PATENT DOCUMENTS

KR 10-2013-0017269 A 2/2013

OTHER PUBLICATIONS

Rasmus Larsen, "How Apple AirPlay & AirPlay Mirroring works", flatpanelshd, Sep. 14, 2012, pp. 1-7.

*Primary Examiner* — Ricky Chin
*Assistant Examiner* — Akshay Doshi
(74) *Attorney, Agent, or Firm* — Jefferson IP Law, LLP

(57) ABSTRACT

A user terminal and a control method thereof, in which contents may be shared with a simple input are provided. The user terminal includes a display configured to display a screen of a content, a communicator configured to communicate with another device, a user input configured to receive a user's input, and a controller configured to determine one transfer mode among a plurality of transfer modes for transferring contents based on information about the contents being executed in one of the user terminal and the other device, and controls the executing content that is transferred between the user terminal and the other device in the determined one transfer mode.

20 Claims, 18 Drawing Sheets

(56) References Cited

U.S. PATENT DOCUMENTS

| | | |
|---|---|---|
| 2011/0078573 A1 | 3/2011 | Ooba |
| 2012/0042102 A1 | 2/2012 | Chung et al. |
| 2012/0081299 A1 | 4/2012 | Xiao et al. |
| 2012/0131458 A1 | 5/2012 | Hayes |
| 2012/0162536 A1 | 6/2012 | Sibilsky et al. |
| 2013/0007817 A1* | 1/2013 | Park .................. H04N 21/4104 725/81 |
| 2013/0113699 A1 | 5/2013 | Lim |
| 2013/0130617 A1* | 5/2013 | Tamura .................. H04N 21/65 455/3.06 |
| 2013/0141331 A1 | 6/2013 | Shiu et al. |
| 2013/0194374 A1* | 8/2013 | Kieft ....................... H04L 67/38 348/14.07 |
| 2013/0219072 A1 | 8/2013 | Han et al. |
| 2014/0012999 A1* | 1/2014 | Chang .................... H04L 67/08 709/228 |
| 2014/0032635 A1 | 1/2014 | Pimmel et al. |
| 2014/0149881 A1* | 5/2014 | Cheng ................... H04W 4/023 715/748 |
| 2014/0359477 A1* | 12/2014 | Chen .................. H04L 67/1095 715/748 |
| 2015/0193069 A1* | 7/2015 | Di Censo ............. G06F 3/0416 345/173 |
| 2015/0312514 A1* | 10/2015 | Kondo .................... H04N 5/64 348/569 |

* cited by examiner

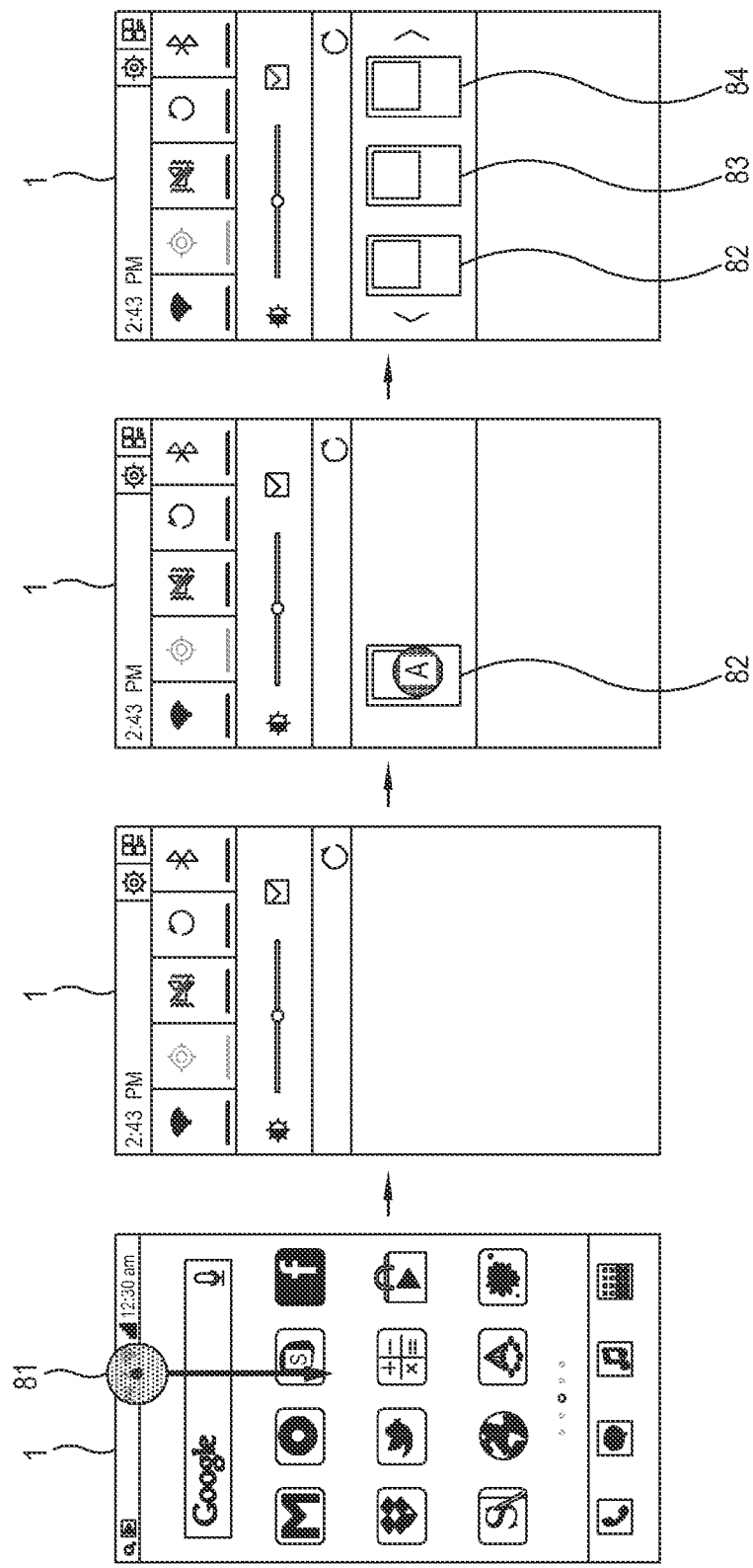

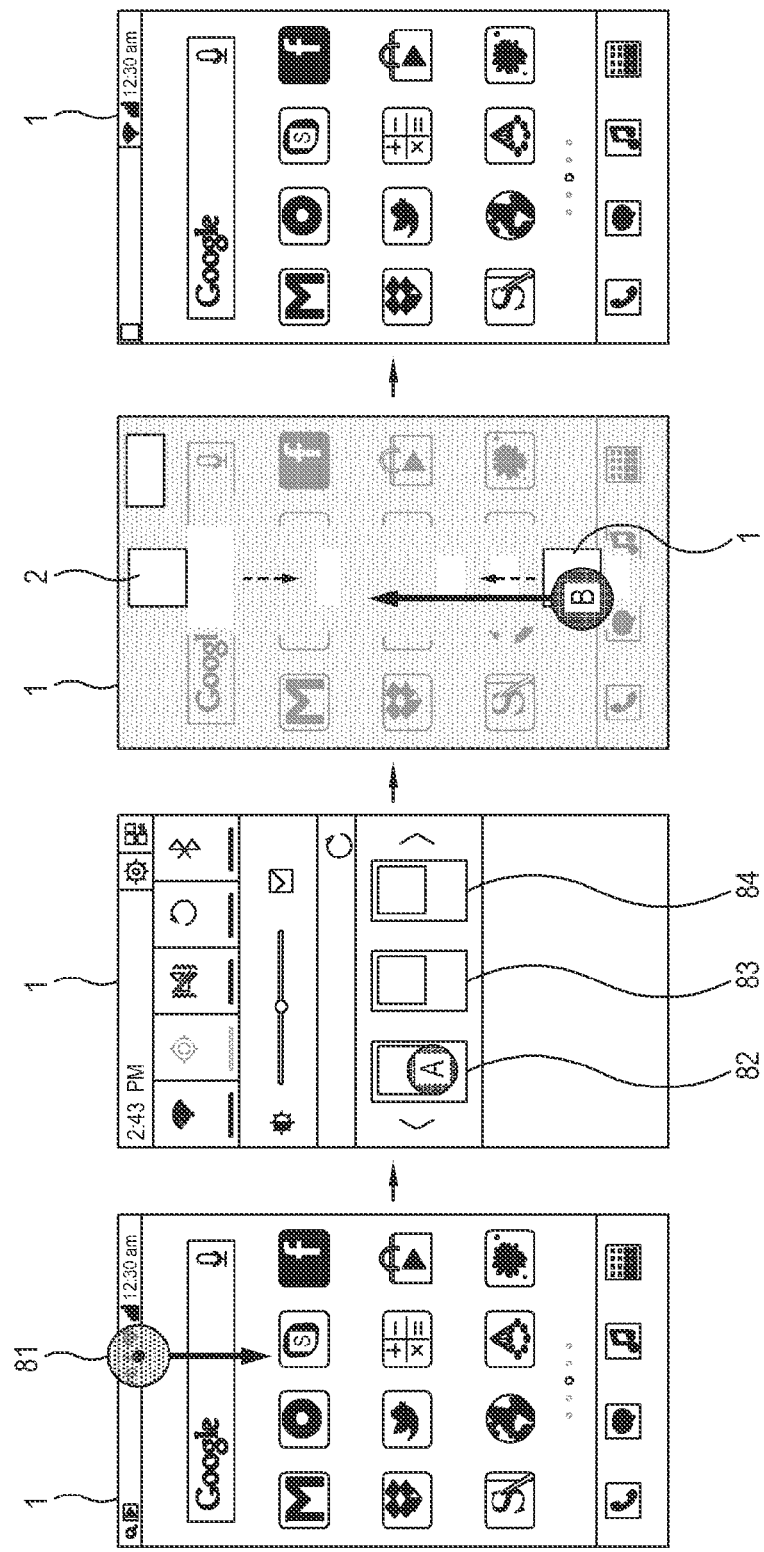

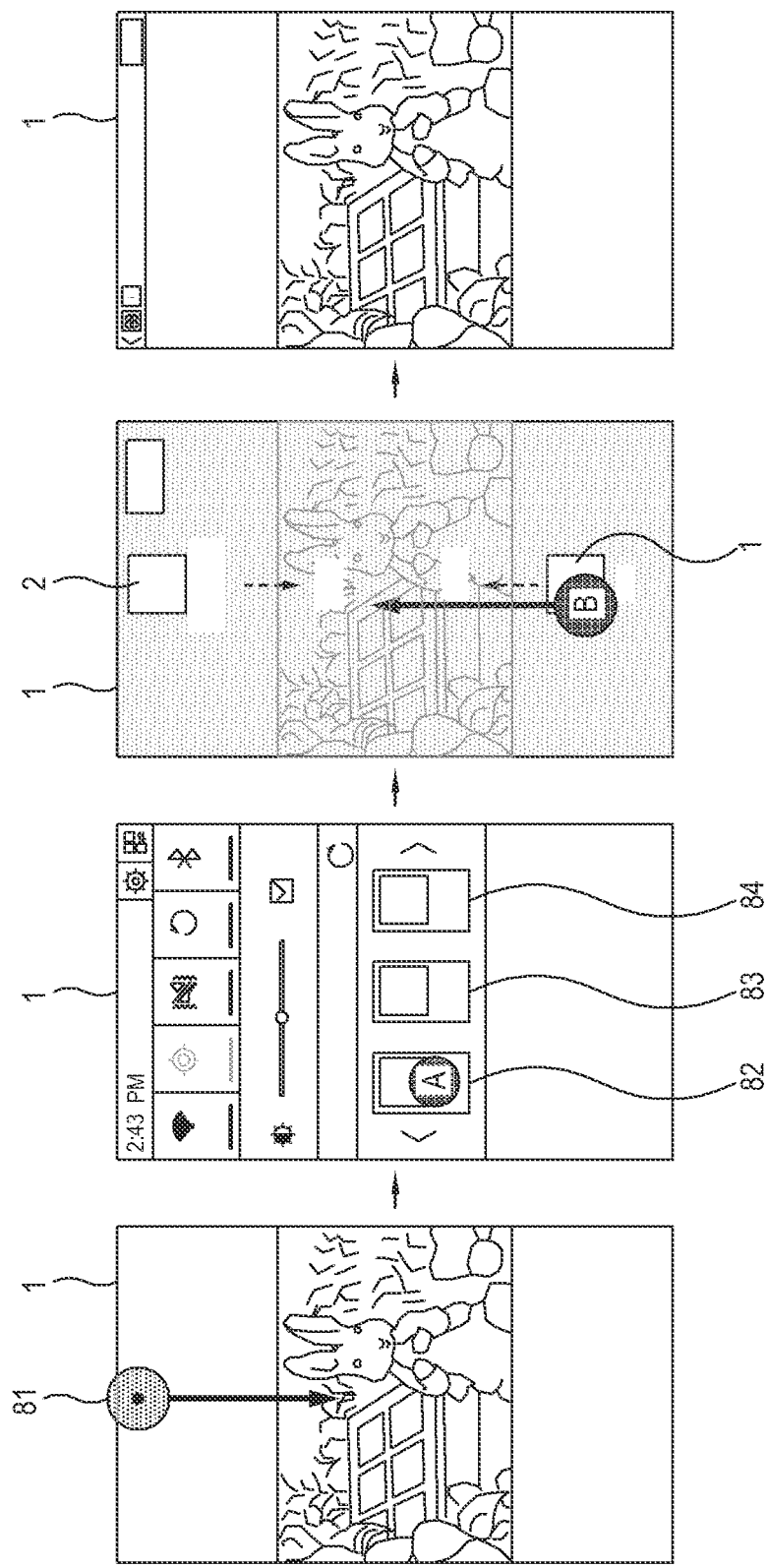

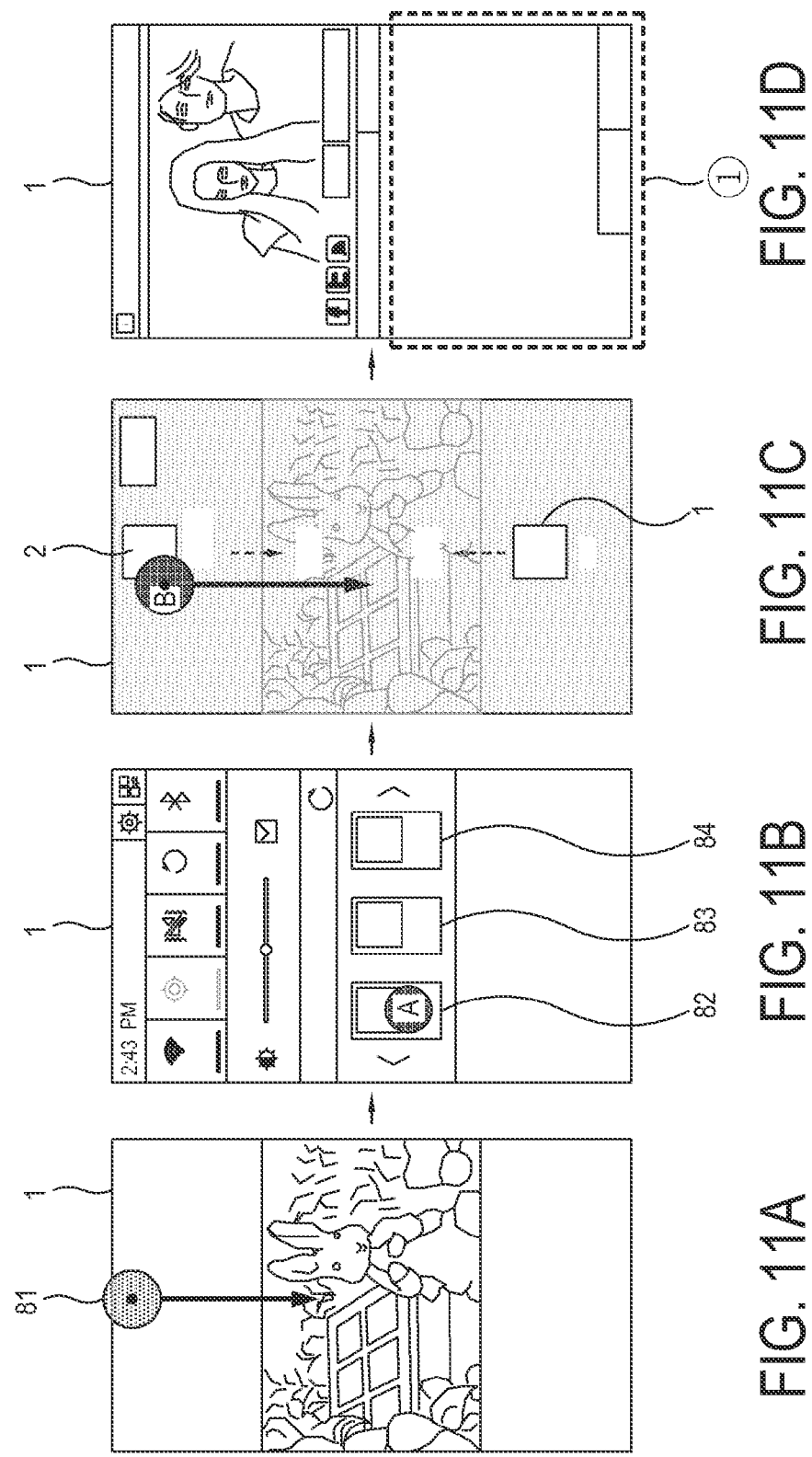

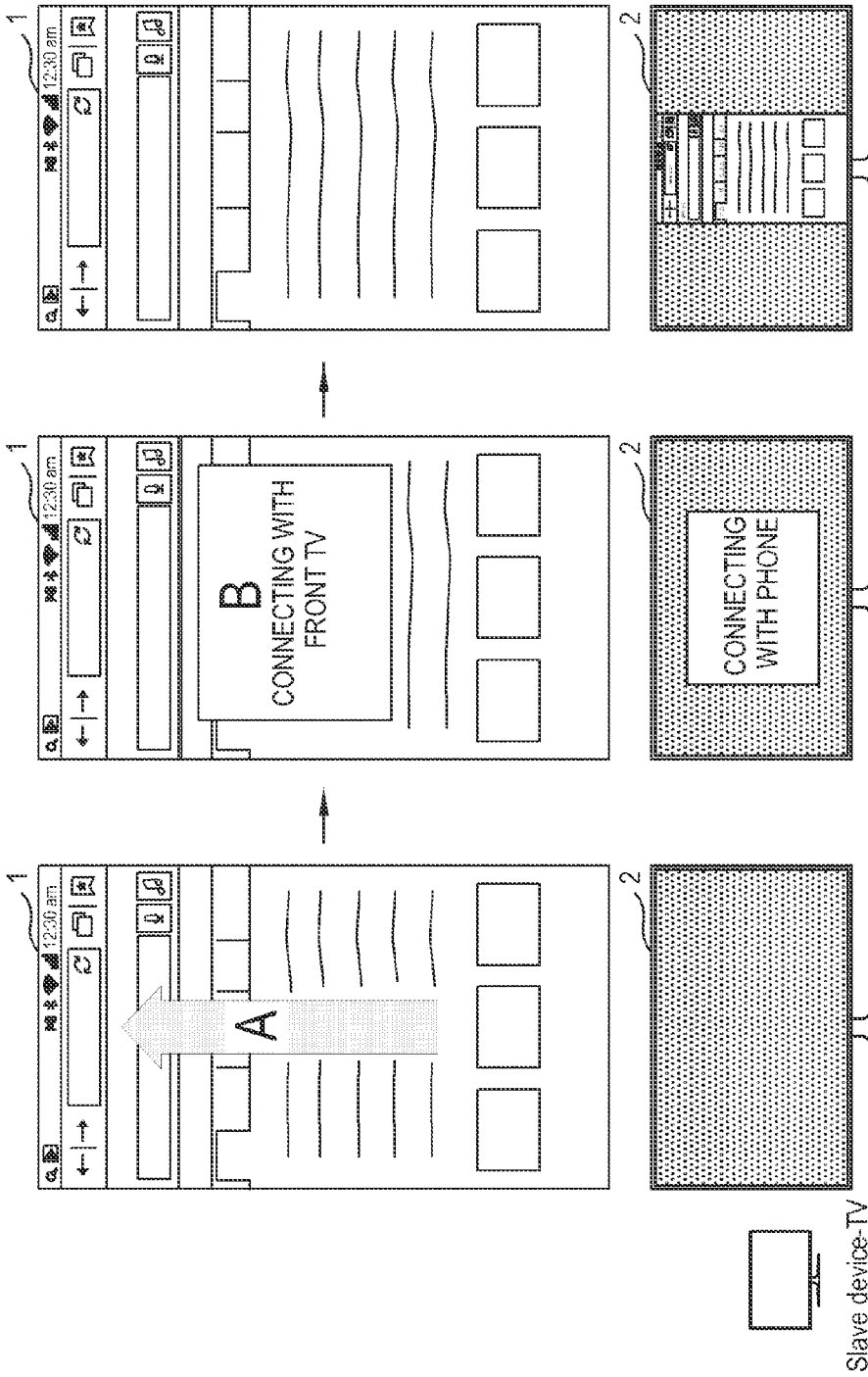

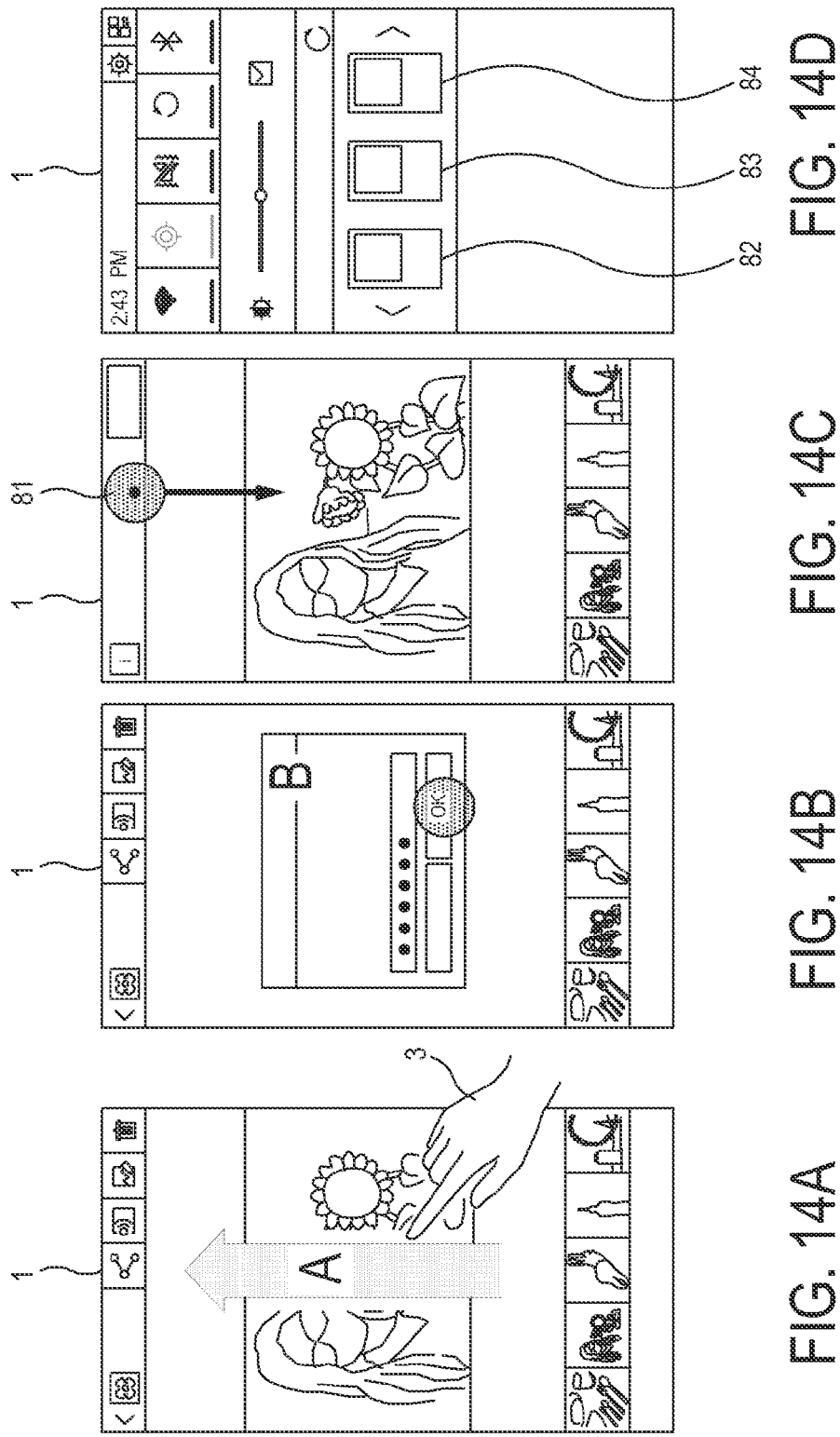

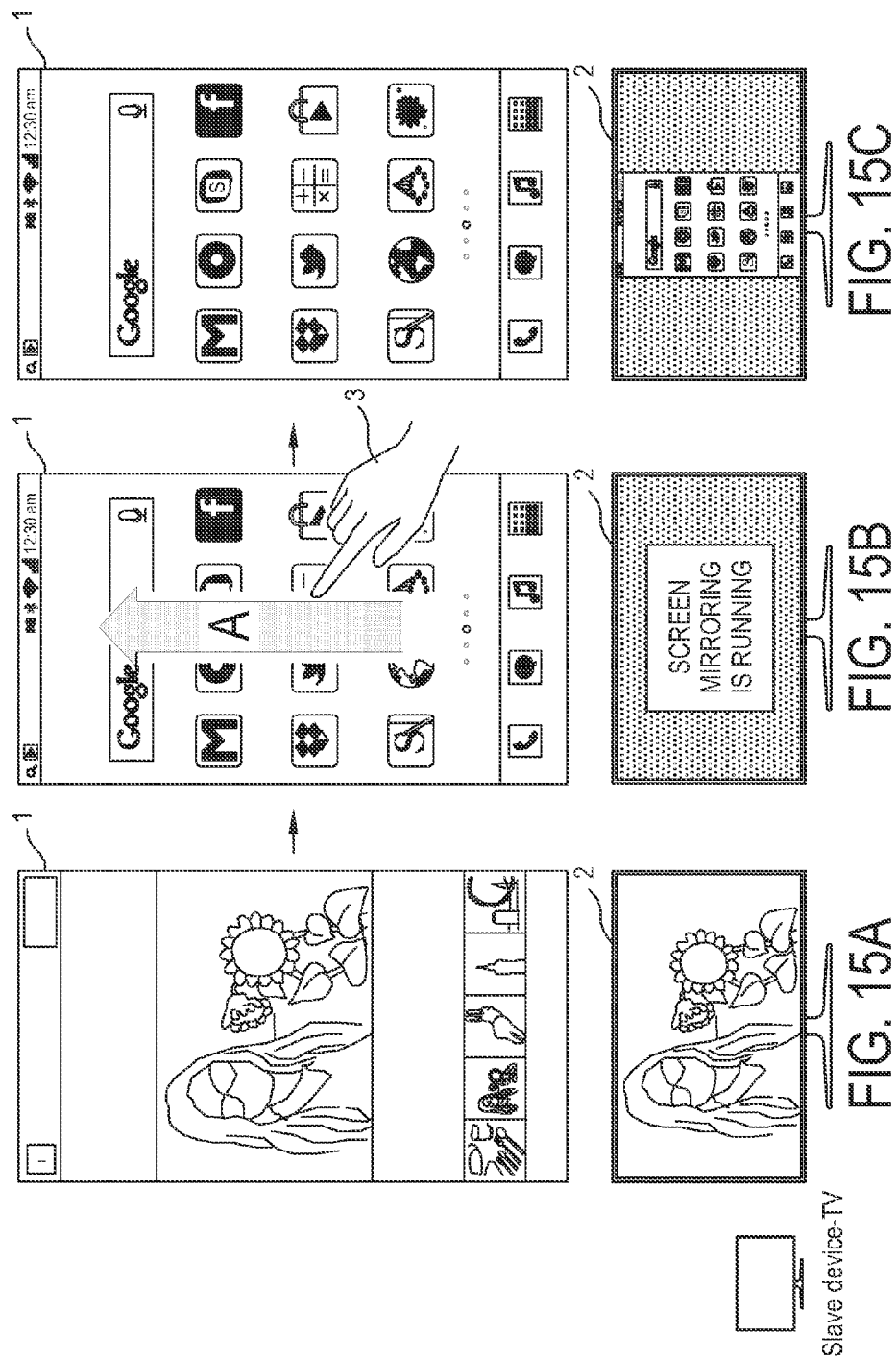

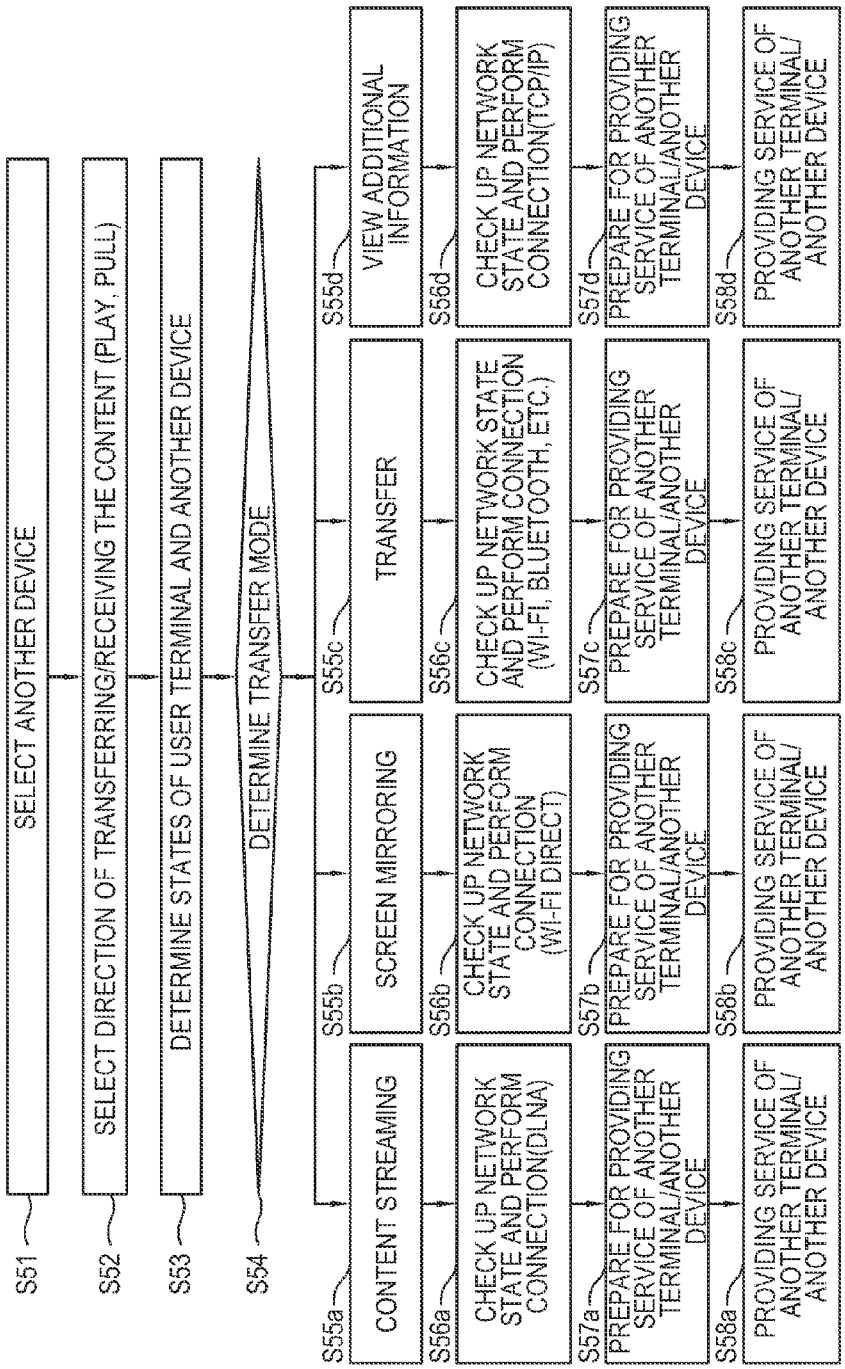

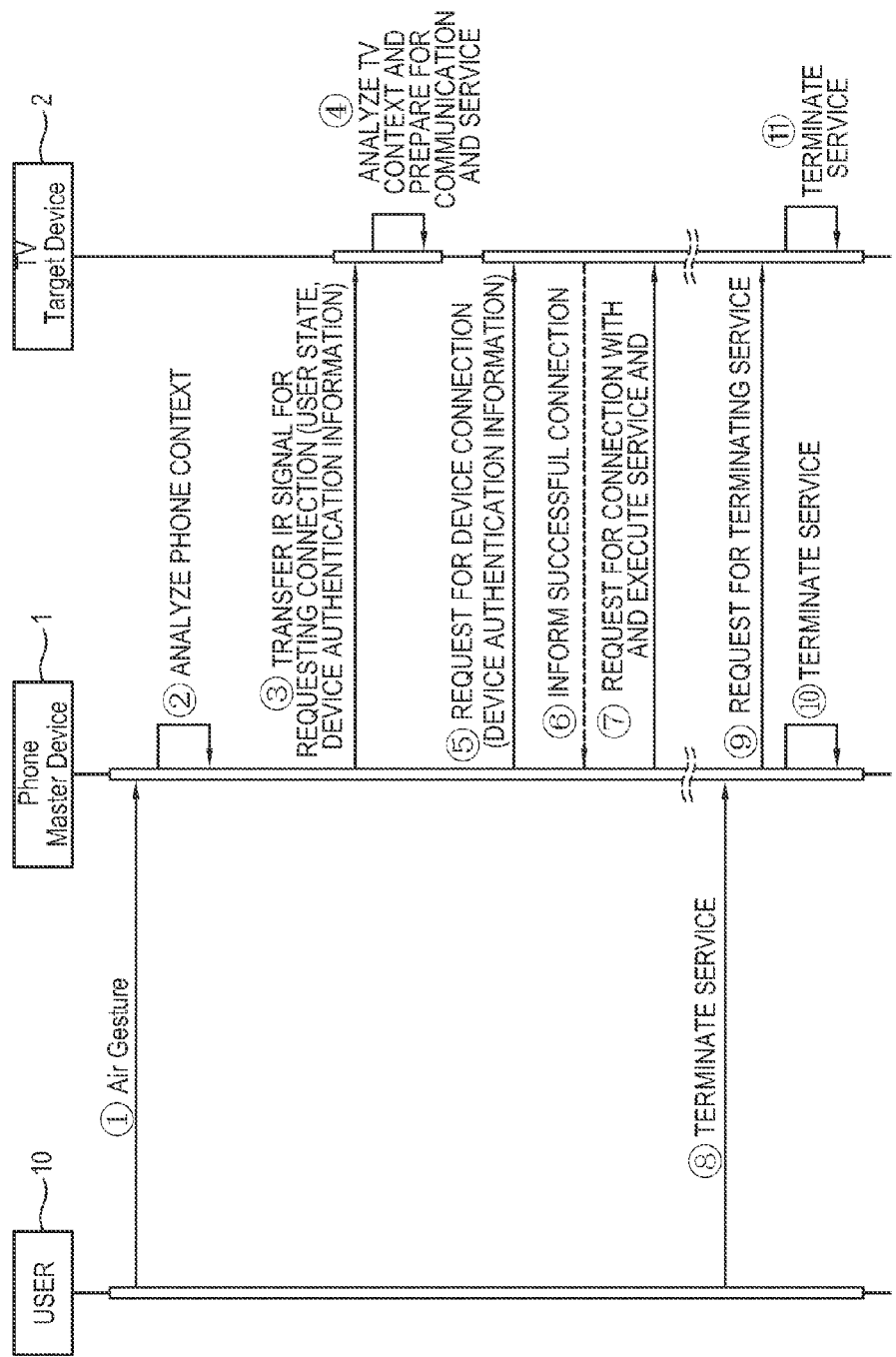

FIG. 18

| Direction | | Master | | | Slave | | Service |
|---|---|---|---|---|---|---|---|
| Play/Pull | Device | Status | | Device | Status | | |
| Play | Phone | Lock-Screen | | - | - | | None |
| | | Gallery > Detail View | | TV | - | | Photo Streaming |
| | | | | TV | Collaborative Album | | Collaborative Album PHOTOGRAPHS upload |
| | | Music > Play View | | TV | - | | Music Streaming |
| | | Video > Play View | | TV | - | | Video Streaming |
| | | - | | TV | - | | Screen Mirroring |
| | PC | Photo Viewer > Detail Viewer | | TV | - | | Photo Streaming |
| | | Media Player > Play View | | TV | - | | Music/Video Streaming |
| | | - | | TV | - | | Screen Mirroring |
| Pull | Phone | | | TV | TV BROADCAST | | BROADCASTING INFORMATION VIEW IN REAL TIME, TV Controller |
| | | | | TV | VOD/Content Streaming | | ADDITIONAL INFORMATION VIEW, TV Controller |
| | | | | PC | - | | Content Browsing, PC Controller |
| | | | | TV | Collaborative Album | | Collaborative Album EXECUTION AND PARTICIPATION |
| | | Digital Bookmark | | TV | - | | EXECUTION OF DIGITAL BOOKMARK FOR REPRODUCED CONTENT |
| | | | | PC | - | | EXECUTION OF DIGITAL BOOKMARK FOR CURRENT RUNNING STATE |
| | PC | | | TV | TV BROADCAST | | BROADCAST INFORMATION VIEW IN REAL TIME, TV Controller |
| | | | | TV | VOD/Content Streaming | | ADDITIONAL INFORMATION VIEW, TV Controller |
| | | | | TV | Collaborative Album | | Collaborative Album EXECUTION AND PARTICIPATION |
| | | Digital Bookmark | | TV | - | | EXECUTION OF DIGITAL BOOKMARK FOR REPRODUCED CONTENT |
| | TV | | | Phone | - | | Content Browsing |
| | | | | PC | - | | Content Browsing |

USER TERMINAL AND CONTROL METHOD THEREOF

CROSS-REFERENCE TO RELATED APPLICATION(S)

This application claims under 35 U.S.C. § 119(a) of a Korean Patent Application filed on Feb. 7, 2014 in the Korean Intellectual Property Office and assigned Serial number 10-2014-0014222, the entire disclosure of which is hereby incorporated by reference.

TECHNICAL FIELD

The present disclosure relates to a user terminal and a control method. More particularly, the present disclosure relates to a user terminal and a control method thereof, in which contents of the user terminal are more conveniently transmitted to another device.

BACKGROUND

User terminals have recently employed various connection modes, that is, third Generation (3G)/Long Term Evolution (LTE), Wireless Fidelity (Wi-Fi), Wi-Fi Direct, Bluetooth, Near Field Communication (NFC), Infrared (IR), and the like in accordance with device purposes of a device.

However, there is difference in service provided according to connection modes, connection modes and use methods, and it is therefore inconvenient and cumbersome for a user to use the service.

When the user terminal tries to stream or mirror contents to another device, entering points and connection procedures are very different from one another even though methods of transferring a screen are similar.

FIGS. 1A, 1B, 1C, and 1D illustrate an example of a procedure where a smart phone is used for streaming contents to another device (i.e., a smart Television (TV)), according to the related art.

Referring to FIGS. 1A to 1D, in FIG. 1A, a predetermined connection mode provided by the smart phone is selected to search another device with which contents may be shared, in FIG. 1B, the searched other device is selected, and, in FIG. 1C, the smart TV also turns on the same connection mode as that of the smart phone through a remote controller and selects to accept or refuse the content. Thus, in FIG. 1D, the content may be transferred from the smart phone to the smart TV. Like this, the transfer of the contents between the user terminal and the other device is achieved through many processes and procedures. Therefore, it is very inconvenient for a user even through he or she knows or does not know the transfer procedures.

Also, a user has to know a characteristic of a connection technique, and use the remote controller of the TV in order to previously select a source of the TV, control an accept popup or a refusal popup on the way of using the smart phone. Further, such cumbersomeness interrupts the user when the content is transferred from the user terminal to the smart TV.

FIGS. 2A, 2B, 2C, and 2D illustrate an example of a procedure a smart phone is used for mirroring a screen to the other device (i.e., the smart TV) according to the related art.

Referring to FIGS. 2A to 2D, in FIG. 2A, a user enters a menu for selecting a predetermined connection mode with the remote controller in the smart TV, in FIG. 2B, a desired connection mode is selected and set up in a quick panel, and, in FIG. 2C, a desired smart phone among the smart phones is selected in the smart phone, and, in FIG. 2D, mirroring is executed.

Referring to FIGS. 2A to 2D, the mirroring procedure is so complicated that even a user skilled in transferring the content through the smart phone may feel uncomfortable.

Thus, there are needed an integrated management method which may integrally manage various user terminals connected through various heterogeneous networks and improve connection between the user terminals and a user's convenience in use by utilizing characteristic and advantageous points according to the connection modes, and the user terminal for selectively providing service in accordance with situation information and screen information from the user terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal and a control method thereof, in which contents of the user terminal may be transferred to another device without selecting a connection mode.

In accordance with an aspect of the present disclosure, a user terminal is provided. The user terminal includes a display configured to display a screen of a content, a communicator configured to communicate with another device, a user input configured to receive a user's input, and a controller configured to determine one transfer mode among a plurality of transfer modes for transferring contents based on information about the contents being executed in one of the user terminal and the other device, and controls the executing content that is transferred between the user terminal and the other device in the determined transfer mode.

The information about the content being executed may include attribute information about at least one among reproduction of a content of one between the user terminal and the opponent device or a broadcast about the content, display of the content, and a wallpaper including user interface (UI) items of an application about the content.

The plurality of transfer modes may include one among transferring, mirroring, and streaming.

The controller may determine a connection mode by determining a network state between the user terminal and the opponent device based on the determined transfer mode.

The connection mode may be previously set up corresponding to the transfer mode, and include one among digital living network alliance (DLNA), wireless-fidelity direct (Wi-Fi direct), Bluetooth and Internet standard protocol (transfer control protocol/Internet protocol (TCP/IP).

The controller may control the connection mode for connection with the opponent device into the determined connection mode if the connection mode for the connection with the opponent device is different from the determined connection mode, and control the opponent device to turn on the determined connection mode if the determined connection mode is turned off in the opponent device.

The controller may display items of at least one of opponent connectable devices in response to a user's input, and determines the opponent device for transferring or receiving information about the content in the displayed items.

The controller may determine the opponent device for transferring or receiving the content being executed corresponding to a user's gesture input if receiving the gesture input.

The controller may determine a heading direction of the gesture input and the opponent device positioned in front of the user terminal.

The controller may determine whether the information about the contents being respectively executed in the user terminal and the opponent device is preset related information, and if it is determined as the preset related information, control one of the contents of the user terminal and the opponent device to contain the other one.

The controller may transfer the content of the user terminal to the opponent device when the user terminal transfers the content being executed, and transfer a control signal to the opponent device so that the content of the opponent device can be transferred to the user terminal when the opponent device transfers the content of being executed.

In accordance with another aspect of the present disclosure, a method of a user terminal is provided. The method includes displaying a screen of a content, receiving a user's input, determining one transfer mode among a plurality of transfer modes for transferring contents based on information about the contents being executed in one of the user terminal and the other device, and transferring the executing content between the user terminal and the other device in the determined transfer mode.

The information about the content being executed may include attribute information about at least one among reproduction of a content of one between the user terminal and the opponent device or a broadcast about the content, display of the content, and a wallpaper including user interface (UI) items of an application about the content.

The plurality of transfer modes may include one among transferring, mirroring, and streaming.

The determining one transfer mode may include determining a connection mode by determining a network state between the user terminal and the opponent device based on the determined transfer mode.

The connection mode may be previously set up corresponding to the transfer mode, and include one among digital living network alliance (DLNA), wireless-fidelity direct (Wi-Fi direct), Bluetooth and Internet standard protocol (transfer control protocol/Internet protocol (TCP/IP).

The determining the correction mode may include changing the connection mode for connection with the opponent device if the connection mode for the connection with the opponent device is different from the determined connection mode, and turning on the determined connection mode of the opponent device to perform connection if the determined connection mode is turned off in the opponent device.

The method may further include displaying items of at least one of opponent connectable devices in response to a user's input; and determining the opponent device for transferring or receiving information about the content in the displayed items.

The method may further include determining the opponent device for transferring or receiving the content being executed corresponding to a user's gesture input if receiving the gesture input.

The determining the opponent device may include determining a heading direction of the gesture input and the opponent device positioned in front of the user terminal.

The transferring the information about the content may includes determining whether the information about the contents being respectively executed in the user terminal and the opponent device is preset related information; and if it is determined as the preset related information, controls one of the contents of the user terminal and the opponent device to contain the other one.

The transferring the information about the content may include: transferring the content of the user terminal to the opponent device when the user terminal transfers the content being executed; and transferring a control signal to the opponent device so that the content of the opponent device can be transferred to the user terminal when the opponent device transfers the content of being executed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or other aspects, features, and advantages of certain embodiments of the present disclosure will be more apparent and from the following description of taken in conjunction with the accompanying drawings, in which:

FIGS. 8A, 8B, 8C, and 8D illustrate an example where a user terminal according to another embodiment of the present disclosure operates for determining another device;

FIGS. 9A, 9B, 9C, and 9D illustrate an example where a user terminal according to another embodiment of the present disclosure operates for mirroring a screen to another device;

FIGS. 10A, 10B, 10C, and 10D illustrate an example where a user terminal according to another embodiment of the present disclosure operates for streaming contents to another device;

FIGS. 11A, 11B, 11C, and 11D illustrate an example where another device according to another embodiment of the present disclosure is controlled for streaming contents from the other device to a user terminal and displaying additional information about contents;

FIGS. 13A, 13B, and 13C illustrate an example where a user terminal according to another embodiment of the present disclosure recognizes a user' gesture and mirrors a web screen to another device;

FIGS. 14A, 14B, 14C, and 14D illustrate an example where a user terminal according to another embodiment of the present disclosure uses a user's gesture and an Access Point (AP) for streaming contents to another device;

FIGS. 15A, 15B, and 15C illustrate an example where a screen is mirrored to another device while a user terminal according to another embodiment of the present disclosure is streaming contents to the other device;

FIG. 16 is a flowchart illustrating operations where a user terminal according to another embodiment of the present disclosure transfers information about contents to another device in accordance with transfer modes;

FIG. 17 is a flowchart illustrating operations where a user terminal according to another embodiment of the present disclosure recognizes a user's gesture; and FIG. 18 is a table illustrating an example of performing conditions of a user terminal according to another embodiment of the present disclosure and another device.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
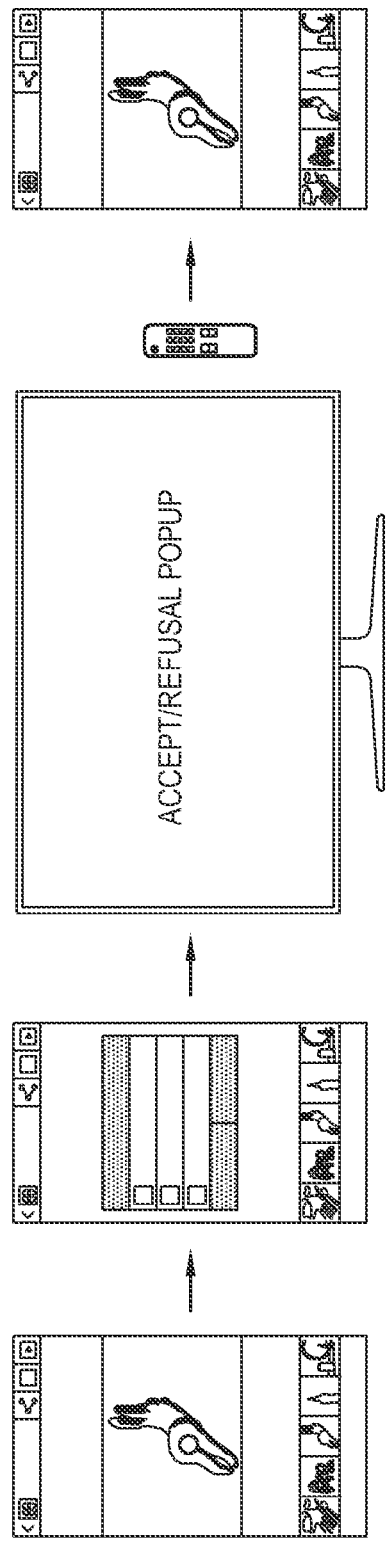
FIGS. 1A, 1B, 1C, and 1D illustrate an example of a procedure where a user terminal is used for streaming contents to another device according to the related art.
Figure 2:
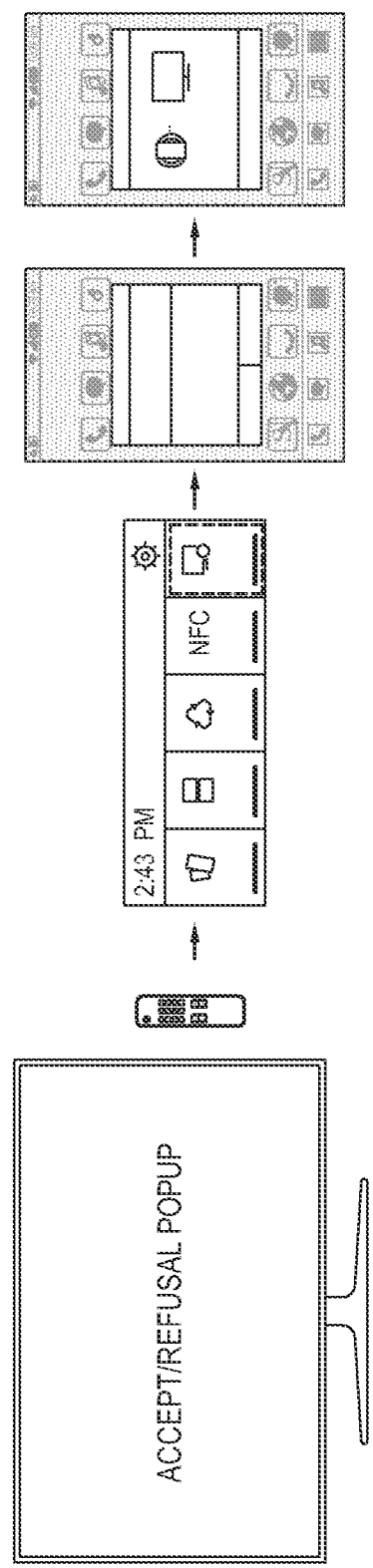
FIGS. 2A, 2B, 2C, and 2D illustrate an example of a procedure where a user terminal is used for mirroring a screen according to the related art.
Figure 3:
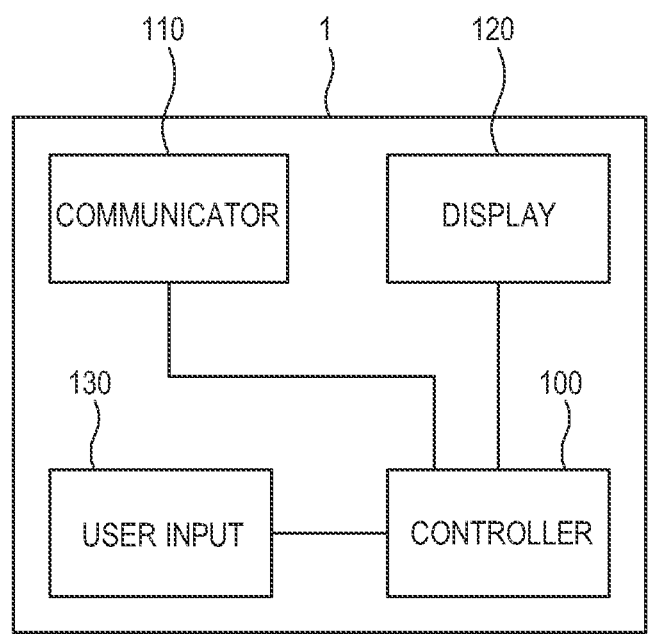
FIG. 3 is a block diagram of a user terminal according to an embodiment of the present disclosure.

FIG. 3 is a block diagram of a user terminal according to an embodiment of the present disclosure.

Referring to FIG. 3, a user terminal 1 may include a communicator 110, a display 120, a user input 130, and a controller 100, but is not limited thereto.

The communicator 110 may receive a signal based on external input and transmit the signal to an image processor 140 or the controller 100. The communicator 110 may connect with various external input cables and receive a signal from the corresponding external input, or may wirelessly receive a signal in accordance with preset wireless communication standards.

The communicator 110 may include a plurality of connectors (not illustrated) to which cables are connected, respectively. The communicator 110 may receive a signal from the connected external input, for example, a broadcasting signal, an image signal, a data signal, and the like, based on a High Definition Multimedia Interface (HDMI), a Universal Serial Bus (USB), a component and the like standards, or communication data through a communication network.

The communicator 110 may include not only elements for receiving a signal/data from the external input but also various additional elements such as a wireless communication module (not illustrated) for wireless communication or a tuner (not illustrated) for tuning a broadcasting signal. The communicator 110 may transmit information/data/signal of the user terminal 1 to an external device in addition to receiving a signal from the external device. That is, the communicator 110 is not limited to the elements for receiving the signal from the external device, but may be achieved by an interface for interactive communication. The communicator 110 may receive a control signal for selecting a User Interface (UI) from a plurality of control devices. The communicator 110 may include a communication module for publicly-known short-range wireless communication such as Bluetooth, Infrared (IR), Ultra Wideband (UWB), Zigbee, and the like, and a publicly-known communication port for wireless communication. The communicator 110 may be used for various purposes to transmit and receive data, a command for controlling a display, and the like, besides a control signal for selecting a UI.

The display 120 may display an image based on an image signal output from the image processor 140. The display 120 may be achieved in various display types such as liquid crystal, plasma, light-emitting diode, organic light-emitting diode, surface-conduction electron-emitter, carbon nanotube, nano-crystal, and the like, but is not limited thereto.

The display 120 may further include additional elements in accordance with the display types. For example, if the display 120 is the liquid crystal type, the display 120 may include a Liquid Crystal Display (LCD) panel (not illustrated), a backlight unit (not illustrated) for emitting light to the panel (not illustrated), and a panel driving substrate (not illustrated) for driving the panel (not illustrated).

The display 120 displays an image based on the image signal processed by the image processor 140. The display 120 includes an LCD, a Plasma Display (PDP), an Organic Light Emitting Diode (OLED), and the like type, but is not limited to the type of displaying an image. In this case, the display 120 may include an LCD panel, a PDP panel, an OLED panel, and the like.

The display 120 may display an image and color compensation. The display 120 may include a display panel for displaying an image thereon, and a panel driver for processing an input image signal and driving the display panel to display an image, but there is no limit to the concrete various embodiments. The image signal received from an external input source through the interface may undergo imaging processes such as decoding, deinterlacing, scaling, and the like, and displayed on the display 120. If the controller 100 performs color compensation in accordance with a user's command 3, the display 120 may display a color compensation process with color patches and color compensated states.

The user input 130 may transmit various preset control commands or information to the controller 100 in response to control and input of a user 3. The user input 130 may be achieved by a menu-key or an input panel installed outside the user terminal 1, a remote controller separated from the user terminal 1, and the like. Also, the user input 130 may be formed integrally with the display 120. If the display 120 is a touch-screen, a user 3 touch an input menu (not illustrated) displayed on the display 120 so that a preset command may be transmitted to the controller 100.

The user input 130 may receive motion and voice of a user 3. The motion of a user 3 may include a touch input. The user input 130 may directly receive the motion and voice of a user 3, or receive information about the motion and voice of a user 3 from the external device.

The controller 100 determines one transfer mode among a plurality of transfer modes about contents based on information about the contents being executed in one of the user terminal 1 and the determined other party device 2, and controls the contents being executed to be transferred between the user terminal 1 and the determined other party device 2 in the determined transfer mode.

Figure 4:
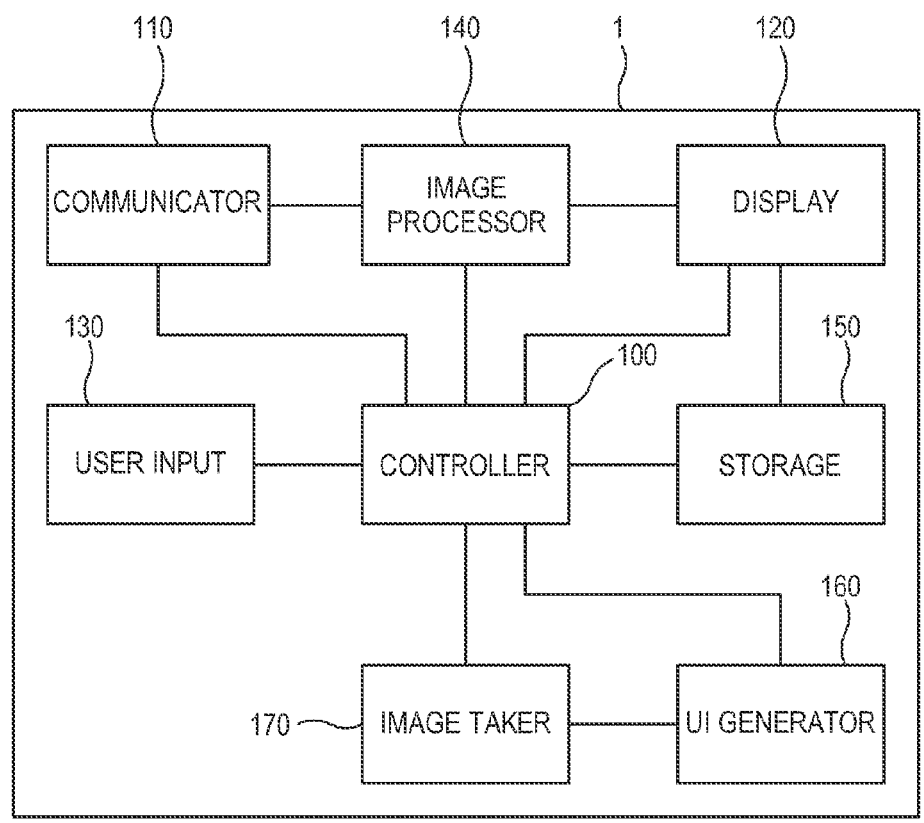
FIG. 4 is a block diagram of a user terminal according to an embodiment of the present disclosure.

FIG. 4 is a block diagram of a user terminal according to an embodiment of the present disclosure.

Referring to FIG. 4, a user terminal 1 may include the elements of FIG. 3, and may additionally include an image processor 140, a storage 150, a UI generator 160, and an image taker 170, but is not limited thereto.

There is no limit to the kinds of imaging process performed in the image processor 140. For example, the imaging process may include de-multiplexing for dividing a predetermined signal into signals corresponding to characteristics, decoding corresponding to a format of an image signal, de-interlacing for converting an interlaced type of an image signal into a progressive type, noise reduction for improving quality of an image, detail enhancement, frame refresh rate conversion, and the like. Meanwhile, there may be provided a decoder (not illustrated) for decoding a source image corresponding to a format of an encoded source image, and a frame buffer (not illustrated) for storing the decoded source image in units of frame.

The image processor 140 may be achieved by a System-On-Chip (SOC) where various functions are integrated, or individual elements for independently performing processes, and may be mounted to a printed circuit board as an image processing board (not illustrated) and embedded in the user terminal 1.

The image processor 140 performs various preset imaging processes with respect to a broadcasting signal including an image signal received from a receiver (not illustrated) and a source image including an image signal received from an image source (not illustrated). The image processor 140 outputs such a processed image signal to the user terminal 1, so that the processed source image may be displayed on the user terminal 1.

The storage 150 may be achieved by a nonvolatile memory (e.g., a writable Read Only Memory (ROM)) which has to retain data even though the user terminal 1 is powered off and which may reflect changes of a user 3. For example, the storage 150 may be provided by one of a flash Memory, an Erasable Programmable ROM (EPROM) and an Electrically Erasable Programmable ROM (EEPROM). The storage 150 may store an application program for displaying/executing/editing the contents. The storage 150 may store an identification code of the user terminal 1.

The UI generator 160 may generate a UI for operating an application program. The generated UI includes a plurality of sub UIs provided in the form of an icon, a text, and the like. If a user 3 selects a certain sub UI through the user terminal 1, an application program may operate corresponding to the selected sub UI. That is, each sub UI may be generated in units of plural functions or events for operating the application program being executed in the user terminal 1.

The UI generator 160 refers to a software or hardware function for generating and controlling a UI displayed on the display 120, and therefore the UI generator 160's function may be performed by the controller 100 (to be described later). In other words, the UI generator 160 may be not achieved by a separate chipset or a separate microprocessor.

The image taker 170 may be achieved by a camera capable of generating an image.

The information about the content being executed may be comprises attribute information about at least one among reproduction of a content of one between the user terminal 1 and the other device 2 or a broadcast about the content, display of the content, and a wallpaper comprising UI items of an application about the content.

The plurality of transfer modes may include one among transferring, mirroring and streaming. For example, a user input may be given for transferring a movie to the other device 2 while watching the movie through the user terminal 1, and the movie may be transferred by the most efficient transfer mode, e.g. the streaming among the transfer modes such as the streaming, mirroring and transferring. The controller 100 may determine a connection mode by checking a network state between the user terminal 1 and the other device 2 based on the determined transfer mode.

The connection mode between the user terminal 1 and the other device 2 is previously set up to correspond to the transfer mode, and may include one among Digital Living Network Alliance (DLNA), Wireless-Fidelity direct (Wi-Fi direct), Wi-Fi, Bluetooth and Transfer Control Protocol/Internet Protocol (TCP/IP).

The controller 100 controls the connection mode connecting with the other device 2 into the determined connection mode if the connection mode for connecting with the other device 2 is different from the determined connection mode, and controls the other device 2 to turn on the determined connection mode if the determined connection mode is turned off in the other device 2.

The controller 100 displays at least one item about connectable the other devices 2 if receiving a user's input, and determines the other device 2 to or from which information about the content will be transferred among the displayed items.

The controller 100 may determine the other device 2 to or from which information about the content being executed will be transferred corresponding to a received gesture input if receiving the gesture input of a user 3. If the gesture of a user 3 is received, a device positioned in front of the user terminal 1 may be determined as the other device 2. If there are a plurality of devices that may be selected as the other device 2, a list of determinable devices is displayed so as to be determined by a user 3. Like a remote controller of a TV, an IR signal is used and it is therefore possible to transfer the content to the device placed in front of the user terminal 1.

The controller 100 may determine the other device 2 placed in a heading direction of the gesture input and in front of the user terminal 1. The controller 100 transfers a signal corresponding to the gesture input to the device in the front and thus determines the corresponding the other device 2.

The controller 100 determines whether information about the contents being respectively executed in the user terminal 1 and the other device 2 is preset relevant information, and controls one of the contents of the user terminal 1 and the other device 2 to include the other one if the information is determined as the preset relevant information. For example, if an image being displayed on a screen of the user terminal 1 is transferred to the other device 2 while the user terminal 1 displays the image and the other device 2 executes an application program for editing an image, the transferred image may be displayed on the other device 2 but may be included in the application program for editing the image.

The controller 100 transfers the content of the user terminal 1 to the other device 2 if the user terminal 1 transfers the contents being executed, and transfers a control signal to the other device 2 so that the content of the other device 2 may be transferred to the user terminal 1 if the other device 2 transfers the contents being executed.

A user input may be achieved by various inputs such as touch & drag, a gesture, a voice, touch of a preset icon, a button input, and the like.

Figure 5:
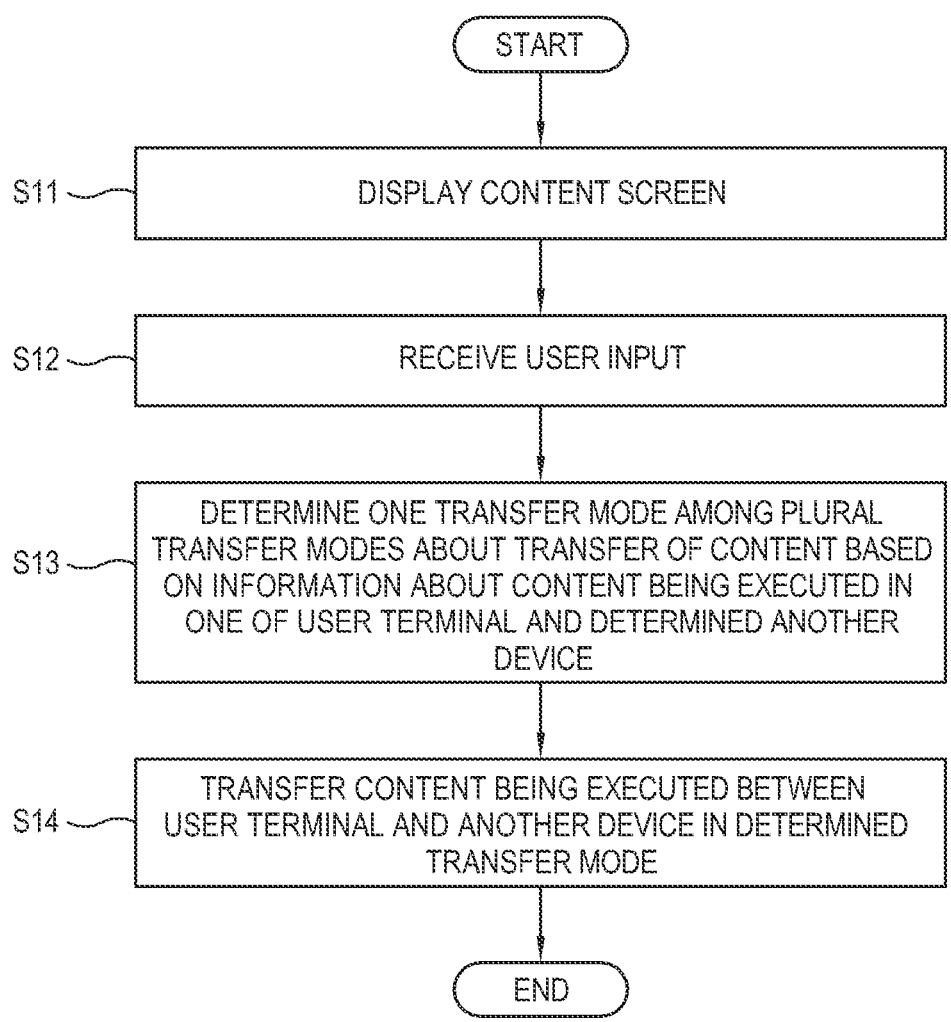
FIG. 5 is a control flowchart illustrating operations of a user terminal according to an embodiment of the present disclosure.

FIG. 5 is a control flowchart illustrating operations of a user terminal according to an embodiment of the present disclosure.

Referring to FIG. 5, a user 3 makes an input so that a content may be displayed on a screen of the user terminal 1 at operation S11.

The user input for transferring the content to the other device 2 is received at operation S12.

The controller 100 may determine one transfer mode among the plurality of transfer modes about the transfer of the content based on information about the content being executed in one of the user terminal 1 and the determined other device 2 at operation S13.

The controller 100 transfers the content being executed between the user terminal 1 and the other device 2 in the determined transfer mode at operation S14.

Figure 6:
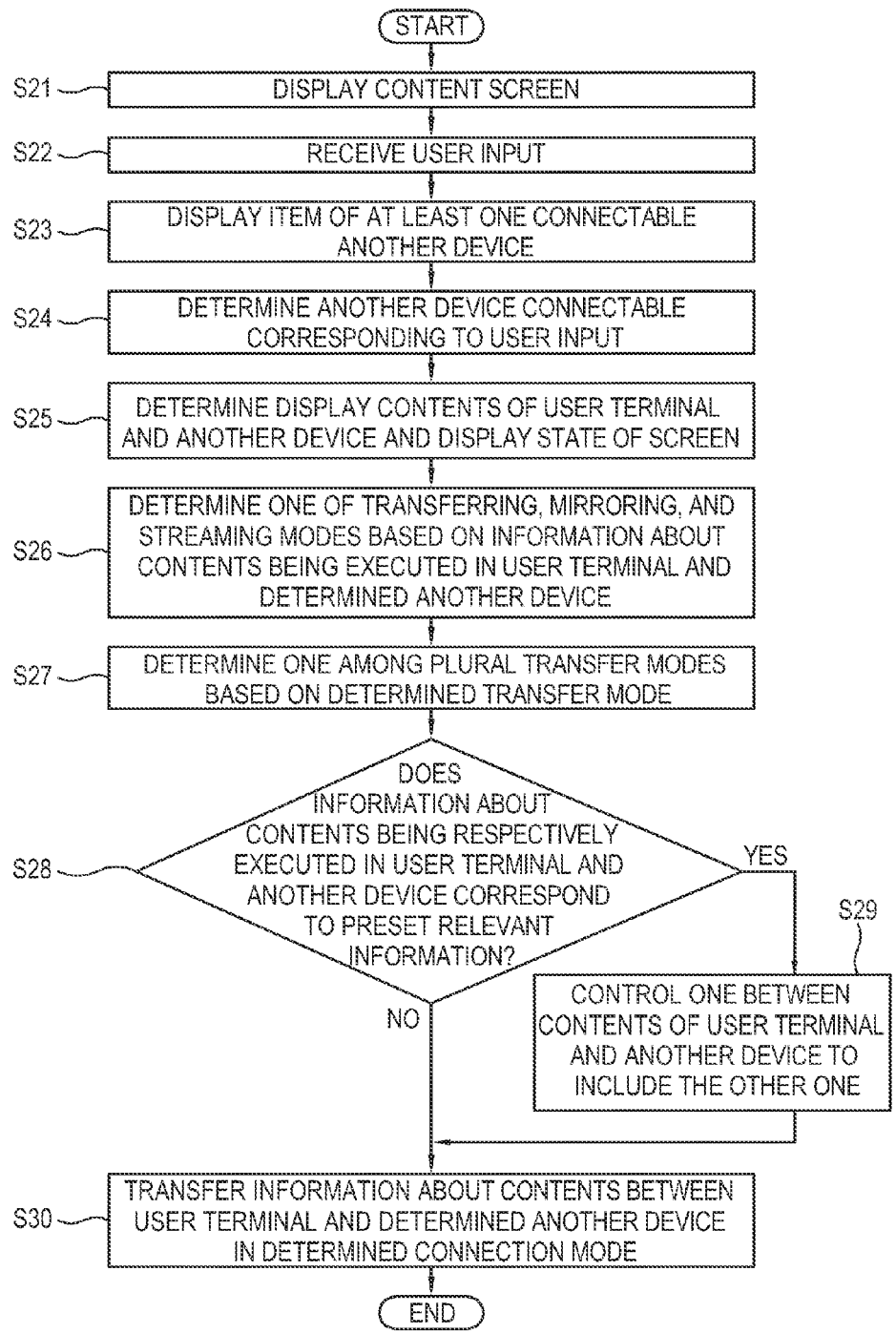
FIG. 6 is a control flowchart illustrating operations of a user terminal according to an embodiment of the present disclosure.

FIG. 6 is a control flowchart illustrating operations of a user terminal according to an embodiment of the present disclosure.

Referring to FIG. 6, a user 3 makes an input so that a content may be displayed on the screen of the user terminal 1 at operation S21.

The user input for transferring the content to the other device 2 is received at operation S22.

The controller 100 displays an item of at least one connectable other device 2 at operation S23. The operations S22 and S23 may be reversed in accordance with the kind of user inputs. For example, if the user input is a drag based on touch, the touch & drag may be received for transferring the content to the other device 2 after displaying an item of at least one connectable other device 2. Also, if the user input is a gesture, an item of at least one connectable another device 2 may be displayed in accordance with the gesture for transferring the content to the other device 2, or the item of the other device 2 may not be displayed.

The other device 2 connectable corresponding to the user input is determined at operation S24. If the user input is a touch & drag, the other device 2 may have already been determined. If the user input is a gesture of a user 3, a device corresponding to the direction of the gesture or placed in front of the user terminal 1 is determined as the other device 2.

If the other device 2 is determined, the information about the contents being executed in the user terminal 1 and the other device 2 is determined at operation S25.

Based on the information about the contents being executed in the user terminal 1 and the determined other device 2, one of transferring, mirroring, and streaming modes is determined at operation S26.

Based on the determined transfer mode, one among the plurality of connection modes is determined at operation S27.

It is determined whether the information about the contents being respectively executed in the user terminal 1 and the other device 2 is the preset relevant information at operation S28.

If it is determined that the information about the contents being respectively executed in the user terminal 1 and the other device 2 is the preset relevant information, one between the contents of the user terminal 1 and the other device 2 is controlled to include the other one at operation S29.

The preset relevant information may for example be a screen image being displayed in the user terminal 1. If the content of the screen displayed in the other device 2 corresponds to an application program for editing an image, the image being executed in the other device 2 may be controlled to be included in the application program for edition when the image is transferred from the user terminal 1 to the other device 2. It is determined whether an image and an application program for editing the image are set up as the preset relevant information.

Then, the contents are transferred between the user terminal 1 and the determined other device 2 in the determined connection mode at operation S30. For example, the content is processed by streaming, and the screen is processed by mirroring.

Figure 7:
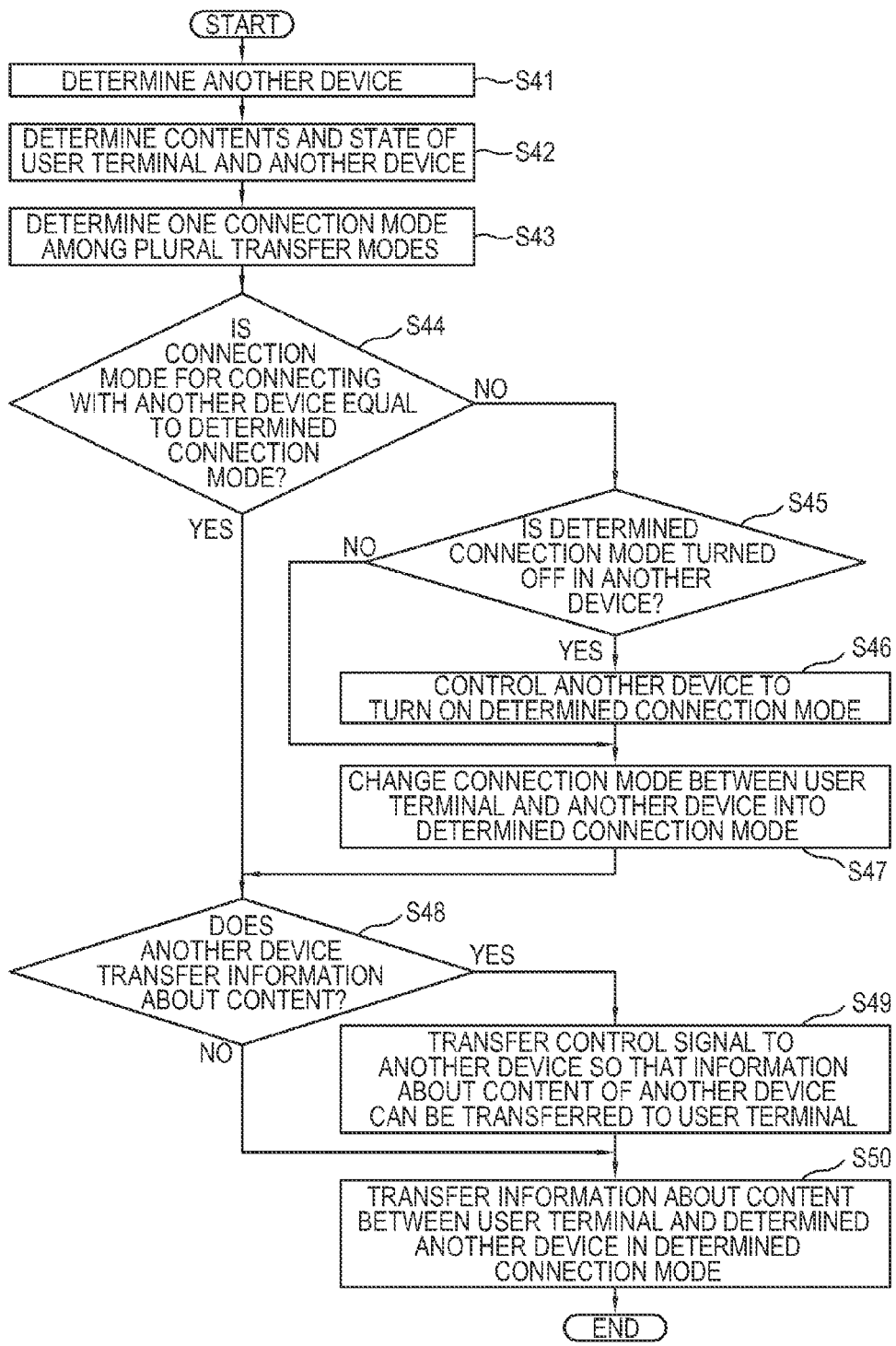
FIG. 7 is a control flowchart illustrating operations of determining a communication mode between a user terminal according to an embodiment and another device of the present disclosure.

FIG. 7 is a control flowchart illustrating operations of determining a transfer mode between a user terminal according to an embodiment of the present disclosure and another device.

Referring to FIG. 7, operations S41, S42 and S43 are the same as those S24, S25 and S26 of FIG. 6, and thus repetitive descriptions thereof will be omitted.

It is determined whether the connection mode for connecting with another device 2 is the same as the determined connection mode at operation S44.

If the connection mode for connecting with the other device 2 is not the same as the determined connection mode, it is determined whether the connection mode determined in the other device 2 is turned off at operation S45.

If the connection mode determined in the other device 2 is turned off, a control signal is transferred so that the connection mode determined in the other device 2 becomes turned on at operation S46.

In the operation S45 if it is determined that the connection mode determined in the other device 2 is not turned off, at an operation S46 the connection mode between the user terminal 1 and the other device 2 is changed into the determined connection mode at operation S47. If it is impossible to change the connection mode between the user terminal 1 and the other device 2, the connection mode may be changed into another preset connection mode determined corresponding to the connection mode before the change.

In the operation S44 if the connection mode for connecting with the other device 2 is the same as the determined connection mode, at operation S47 it is determined whether the other device 2 transfers the content at operation S48.

If it is determined that the other device 2 does not transfer the content, the control signal is transferred to the other device so that the content of the other device 2 may be transferred to the user terminal 1 at operation S49.

If the other device 2 transfers the content, at operation S49 the content between the user terminal 1 and the determined other device 2 is transferred in the determined connection mode at operation S50.

FIGS. 8A to 8D illustrate an example where a user terminal according to another embodiment of the present disclosure operates for determining another device.

Referring to FIGS. 8A to 8D, in FIG. 8A a notice board 81 of a user terminal 1 is pushed down, in FIG. 8B icons 82, 83 and 84 of the connectable Wi-Fi, Wi-Fi Direct and Bluetooth devices are automatically searched, in FIG. 8C the searched devices are displayed regardless of the connection mode, only one is displayed among searched overlapping devices, a TV icon 82 in a living room is displayed, and in FIG. 8D (the icons 82, 83 and 84 of the searched devices are displayed. The searched devices may be selected by an input A of a user 3.

FIGS. 9A to 9D illustrate an example where a user terminal according to another embodiment of the present disclosure operates for mirroring a screen to another device.

Referring to FIGS. 9A to 9D, in FIG. 9A a notice board 81 of the user terminal 1 is pushed down, in FIG. 9B a TV icon 82 in a living room among icons 82, 83 and 84 of the connectable devices selects the other device 2, in FIG. 9C the user terminal 1 and the other device 2 are displayed by the selection of the other device 2 and the user terminal 1 is touched and dragged in a direction toward the other device 2, and in FIG. 9D if mirroring for the screen is determined as the transfer mode based on the displayed screen of the user terminal 1, the user terminal 1 and the other device 2 (i.e., the TV 2 of the living room), are controlled to be connected by the connection mode (e.g., Wi-Fi direct) corresponding to the mirroring and then the mirroring is performed. Mirroring is completed, the same screen as the screen of the user terminal 1 is displayed on the other device 2.

FIGS. 10A to 10D illustrate an example where a user terminal according to another embodiment operates for streaming contents to another device.

Referring to FIGS. 10A to 10D, in FIG. 10A a notice board 81 of the user terminal 1 is pushed down, in FIG. 10B a TV icon 82 in a living room among icons 82, 83 and 84 of the connectable devices is selected as the other device 2, in FIG. 10C the user terminal 1 and the other device 2 are displayed by the selection of the other device 2, and the user terminal 1 is touched and dragged toward the other device 2, and in FIG. 10D if streaming is determined as the transfer mode based on the displayed screen of the user terminal 1, the user terminal 1 and the other device 2, i.e., the TV 2 of the living room are controlled to be connected by the connection mode, e.g., DLNA corresponding to the streaming and then the contents are streamed to the other device 2. If the streaming of the contents is completed, the same content as the content of the user terminal 1 is displayed on the other device 2.

FIGS. 11A to 11D illustrate an example where the other device according to another embodiment of the present disclosure is controlled for streaming contents from another device to the user terminal and displaying additional information about contents;

Referring to FIGS. 11A to 11D, in FIG. 11A a notice board 81 of the user terminal 1 is pushed down, in FIG. 11B a TV icon 82 in a living room among icons 82, 83 and 84 of the connectable devices is selected as the other device 2, in FIG. 11C the user terminal 1 and the other device 2 are displayed by the selection of the other device 2, and the other device 2 is touched and dragged toward the user terminal 1, and in FIG. 11D if streaming is determined as the transfer mode based on the displayed screen of the other device 2, the user terminal 1 and the other device 2 (i.e., the TV 2) of the living room are controlled to be connected by the connection mode, e.g., DLNA corresponding to the streaming and then the contents are streamed to the user terminal 1 while additional information10 about the contents being reproduced in the other device 2 is displayed in a certain region. If the streaming of the contents is completed, the same content as the content of the user terminal 1 is displayed on the other device 2.

Figure 12A:
FIGS. 12A, 12B, and 12C illustrate an example where a user terminal according to another embodiment of the present disclosure recognizes a user' gesture and streams contents to another device.
Figure 12B:
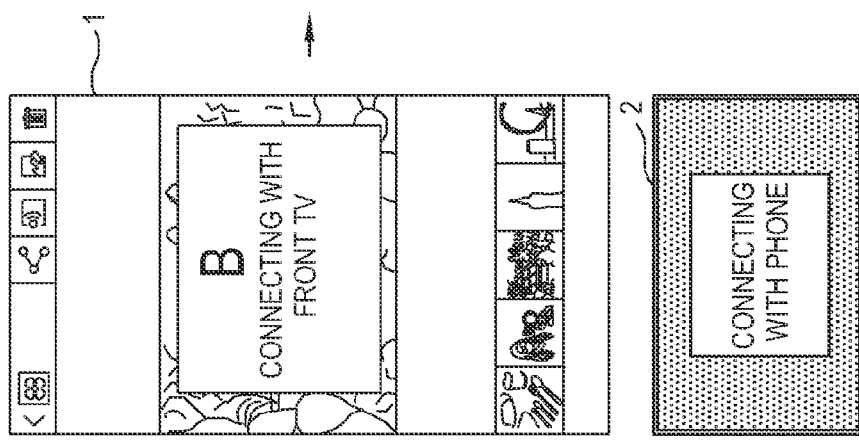
Figure 12C:
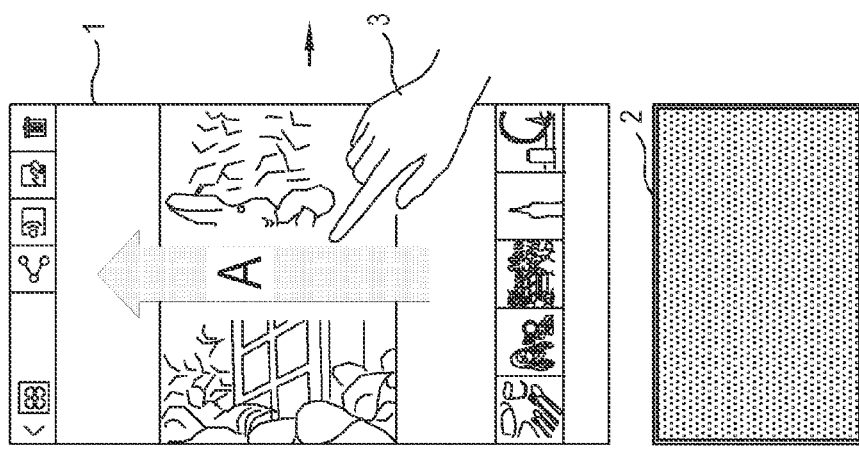

FIGS. 12A to 12C illustrate an example where a user terminal according to another embodiment of the present disclosure recognizes a gesture of a user and streams contents to another device. The streaming operations are the same as those illustrated in FIGS. 9A to 9D, 10A to 10D, and 11A to 11D, and detailed descriptions thereof will be avoided.

Referring to FIGS. 12A to 12C, in FIG. 12A a gesture A is input while the contents are reproduced, and in FIG. 12B connection B between the user terminal 1 and the front other device 2 are achieved by IR and the content being reproduced in the user terminal 1 is streamed to the other device 2. FIG. 12C illustrates that the contents are completely streamed to the other device 2 and the contents being reproduced in the user terminal 1 are reproduced in the other device 2.

FIGS. 13A to 13C illustrate an example where a user terminal according to another embodiment of the present disclosure recognizes a gesture of a user and mirrors a web screen to another device. The mirroring operations are the same as those illustrated in FIGS. 9A to 9D, 10A to 10D, and 11A to 11D, and thus detailed descriptions thereof will be avoided.

Referring to FIGS. 13A to 13C, in FIG. 13A a gesture A of a user 3 is input while a web page is displayed on the screen of the user terminal 1, and in FIG. 13B connection B between the user terminal 1 and the front another device 2 is achieved by IR and the web screen of the user terminal 1 is mirrored to the other device 2. FIG. 13C illustrates that the web screen is completely mirrored to the other device 2 and thus the web screen being displayed on the user terminal 1 is displayed on the other device 2.

FIGS. 14A to 14D illustrate an example where a user terminal according to another embodiment of the present disclosure uses a gesture of a user and an Access Point (AP) for streaming contents to another device. The streaming operations are the same as those illustrated in FIGS. 9A to 9D, 10A to 10D and 11A to 11D, and thus detailed descriptions thereof will be avoided.

Referring to FIGS. 14A to 14D, in FIG. 14A a user terminal 1 not connected to a connection terminal (not illustrated) (i.e., the AP), tries to connect with another device 2 connected to the AP through a gesture A of a user 3, in FIG. 14B a password for the AP is input by receiving information B about the AP connected to the other device 2 and connection to the AP is performed, and in FIG. 14C the content is streamed to the other device 2 through the AP after the connection to the AP is performed. FIG. 14D illustrates that if the notice board 81 is pushed down, icons 82, 83 and 83 connected to the AP may be displayed together with the other device 2.

FIGS. 15A to 15C illustrate an example where a screen is mirrored to another device while a user terminal according to another embodiment is streaming contents to a second other device. If authenticated devices have been already connected by one connection mode and there is a need of connection for another connection mode between them, the devices are connected without separate device searching and authentication procedures and the information about the content may be transferred.

Referring to FIGS. 15A to 15C, in FIG. 15A the content is being streamed between the user terminal 1 and the other device through DLNA, in FIG. 15B if mirroring for a screen is executed by a gesture A of a user 3, the connection mode for Wi-Fi direct between two devices is automatically activated, and in FIG. 15C screen mirroring is directly performed without separate device searching, connection and authentication procedures for Wi-Fi direct.

FIG. 16 is a flowchart illustrating operations where a user terminal according to another embodiment of the present disclosure transfers information about contents to another device in accordance with transfer modes.

Referring to FIG. 16, another device 2 is selected at operation S51.

A direction of transferring/receiving the content is selected at operation S52.

Information about the contents being executed in the user terminal 1 and the other device 2 is determined at operation S53.

In accordance with the determined information about the contents being executed, the transfer mode (transferring, mirroring or streaming) is determined at operation S54.

If the content is streamed at operation S55a, a network state is checked up and a connection mode between the user terminal 1 and the other device 2 is performed at operation S56a. The streaming between the user terminal 1 and the other device 2 is prepared at operation S57a. The streaming between the user terminal 1 and the other device 2 is performed at operation S58a.

The procedures for screen mirroring in operations, S55b, S56b, S57b and S58b, transferring in operations S55c, S56c, S57c and S58c and view additional information S55d, S56d, S57d and S58d are similar to the procedure of streaming the contents, and thus repetitive descriptions thereof will be avoided.

FIG. 17 is a flowchart illustrating operations where a user terminal according to another embodiment of the present disclosure recognizes a gesture of a user.

Referring to FIG. 17, a procedure of transferring the content from the user terminal 1 (e.g., a smart phone 1) to another device 2 (i.e., a smart TV 2) in response to the gesture of a user 3.

A user 3 inputs a gesture to the smart phone 1 at operation ①.

The smart phone 1 analyzes the states of the smart phone 1 of transferring the content in response to the gesture, and the information about the contents being executed at operation ②.

The smart phone 1 transfers an IR signal for requesting the connection with the device to the smart TV 2 placed in front of the smart phone 1 at operation ③. The IR signal may include the states of the smart phone 1, device authentication information, and the like.

The smart TV 2, which receives the IR signal, analyzes the states of the smart TV 2 and the information about the content being executed and prepares for communication and display of the content at operation ④.

The smart phone 1 requests for the device connection to the smart TV 2, including the device authentication information at operation ⑤.

Thus, the smart TV 2 checks the smart phone 1 through an authentication procedure, and informs the smart phone 1 of successful connection at operation ⑥.

The smart phone 1 request for connection with the contents corresponding to a gesture of a user 3 to the smart TV 2, thereby performing the connection and transferring the content at operation ⑦.

A user's input is made for terminating the execution of the content at Operation ⑧.

Thus, the smart phone 1 requests for terminating the execution of the content to the smart TV 2 at operation ⑨.

The smart phone 1 terminates the transfer of the content at operation ⑩.

Thus, the smart TV 2 also terminates the execution of the content at operation ⑪.

FIG. 18 is a table illustrating an example of performing conditions of a user terminal according to another embodiment of the present disclosure and another device.

Referring to FIG. 18, an example of the transfer mode executed in accordance with the contents transferred the situations and state conditions of the user terminal 1 and the other device 2 is illustrated.

For example, if a command is issued to transfer the content to a smart TV 2 while a tablet PC 1 executes a media player, music/a video is streamed to the smart TV 2.

In the foregoing user terminal 1, a user may share the contents by transferring/receiving the contents to/from the other device 2 through easy and simple inputs, without complicated and difficult procedures such as setting up the transfer mode and the connection mode for sharing the contents.

As described above, it is more convenient for a user since the content of the user terminal is transferred by determining the other device, and the speed of transferring the contents is enhanced because the transfer mode is determined in accordance with the situations and states of the user terminal.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. A user terminal comprising:
 a display configured to display a screen of a content;
 a communicator configured to communicate with an other device including communicating, as part of a connection request, a state of the user terminal to the other device;
 a user interface configured to receive a user's input; and
 at least one computer processor configured to:
  execute the content in the user terminal,
  during execution of the content in the user terminal, in response to a user command for transferring of the content to the other device, display an icon of the user terminal and an icon of the other device on the user interface, and
  in response to a user selection of the icon of the user terminal on the user interface moving toward the icon of the other device:
   analyze the content being executed in the user terminal before transferring the content,
   determine one transfer mode among a plurality of transfer modes for transferring content based on information about analysis of the content being executed in the user terminal,
   wirelessly control, using an infrared signal, the other device to turn on an identified connection mode between the user terminal and the other device, out of a plurality of possible connection modes, based on a determination that the identified connection mode is turned off in the other device, and
   transfer the content being executed in the user terminal to the other device, wherein the connection mode comprises one or more among: Digital Living Network Alliance (DLNA), Wireless-Fidelity direct (Wi-Fi direct), Bluetooth or Internet standard protocol (Transfer Control Protocol/ Internet Protocol (TCP/IP).

2. The user terminal according to claim 1, wherein the information about analysis of the content being executed comprises attribute information about at least one of reproduction of a content between the user terminal and the other device, a broadcast about the content, display of the content, and a wallpaper application displaying items of the content.

3. The user terminal according to claim 1, wherein the plurality of transfer modes comprises one among transferring, mirroring, and streaming.

4. The user terminal according to claim 1, wherein the at least one computer processor, when determining the one transfer mode between the user terminal and the other device, is further configured to:
display items of one or more other connectable devices in response to a user's input, and
identify the other device from among the one or more other connectable devices.

5. The user terminal according to claim 1, wherein the at least one computer processor is further configured to:
determine the other device for transferring content, and
receive the content being executed corresponding to a user's gesture input if receiving the gesture input.

6. The user terminal according to claim 1, wherein the at least one computer processor is further configured to:
determine whether the information indicates content being executed in the user terminal and content being executed in the other device is related to preset information, and
control, if it is determined that the content being executed in the user terminal and the content being executed in the other device is related to the preset information, one of the content of the user terminal and the other device,
wherein the control causes the content being executed in the other device to contain the content executed in the user terminal.

7. The user terminal according to claim 1, wherein the at least one computer processor is further configured to:
transfer the content of the user terminal to the other device when the user terminal transfers the content being executed, and
transfer a control signal to the other device so that the content of the other device is transferred to the user terminal when the other device transfers the content of being executed.

8. The user terminal according to claim 3, wherein the at least one computer processor is further configured to determine the connection mode by determining a network state between the user terminal and the other device based on the determined one transfer mode.

9. The user terminal according to claim 5, wherein the at least one computer processor is further configured to determine a heading direction of the gesture input and the other device positioned in front of the user terminal.

10. The user terminal according to claim 8, wherein the connection mode is previously set up corresponding to the determined one transfer mode.

11. The user terminal according to claim 8, wherein the at least one computer processor is further configured to:
control the connection mode for connection with the other device into the determined connection mode if the connection mode for the connection with the other device is different from the determined connection mode.

12. A method of a user terminal, the method comprising:
displaying a screen of a content;
receiving a user's input;
executing the content in the user terminal;
during execution of the content in the user terminal, in response to a user command for transferring of the content to an other device, displaying an icon of the user terminal and an icon of the other device on the user interface, and
in response to a user selection of the icon of the user terminal on the user interface moving toward the icon of the other device:
analyzing the content being executed in the user terminal before transferring the content,
determining one transfer mode among a plurality of transfer modes for transferring content based on information about analysis of the content being executed in the user terminal,
wirelessly controlling, using an infrared signal, the other device to turn on an identified connection mode between the user terminal and the other device, out of a plurality of possible connection modes, based on a determination that the identified connection mode is turned off in the other device, and
transferring the content being executed in the user terminal to the other device,
wherein the connection mode comprises one or more among: Digital Living Network Alliance (DLNA), Wireless-Fidelity direct (Wi-Fi direct), Bluetooth or Internet standard protocol (Transfer Control Protocol/ Internet Protocol (TCP/IP).

13. The method according to claim 12, wherein the information about the content being executed comprises attribute information about at least one of reproduction of a content between the user terminal and the other device, a broadcast about the content, display of the content, and a wallpaper application displaying items of the content.

14. The method according to claim 12, wherein the plurality of transfer modes comprises one among transferring, mirroring, and streaming.

15. The method according to claim 12, wherein the determining of the one transfer mode between the user terminal and the other device comprises:
displaying items of one or more other connectable devices in response to a user's input; and
determining the other device from among the one or more other connectable devices.

16. The method according to claim 12, further comprising determining the other device for one of transferring and receiving the content being executed corresponding to a user's gesture input if receiving the gesture input.

17. The method according to claim 14, wherein the determining of one transfer mode comprises determining the connection mode by determining a network state between the user terminal and the other device based on the determined one transfer mode.

18. The method according to claim 16, wherein the determining of the other device comprises determining a heading direction of the gesture input and the other device positioned in front of the user terminal.

19. The method according to claim 17, wherein the connection mode is previously set up corresponding to the determined one transfer mode.

20. The method according to claim 17, wherein the determining of the connection mode comprises changing the connection mode for connection with the other device if the connection mode for the connection with the other device is different from the determined connection mode.

\* \* \* \* \*